United States Patent
Pan et al.

(10) Patent No.: US 11,614,755 B2
(45) Date of Patent: Mar. 28, 2023

(54) VENT VALVE FOR AN INNER FLOATING ROOF

(71) Applicant: JING KAI INDUSTRIAL CO., LTD., Kaohsiung (TW)

(72) Inventors: Wen-Pin Pan, New Taipei (TW); Shu-Wen Yen, New Taipei (TW)

(73) Assignee: JING KAI INDUSTRIAL CO., LTD., Kaohsiung (TW)

( * ) Notice: Subject to any disclaimer, the term of this patent is extended or adjusted under 35 U.S.C. 154(b) by 455 days.

(21) Appl. No.: 16/867,936

(22) Filed: May 6, 2020

(65) Prior Publication Data

US 2021/0208613 A1 Jul. 8, 2021

(30) Foreign Application Priority Data

Jan. 8, 2020 (TW) .................................. 109100604

(51) Int. Cl.
*G05D 7/01* (2006.01)
*F16K 24/04* (2006.01)
*B65D 88/34* (2006.01)
(Continued)

(52) U.S. Cl.
CPC ........... *G05D 7/0153* (2013.01); *B65D 88/34* (2013.01); *B65D 90/34* (2013.01); *F16K 24/044* (2013.01);
(Continued)

(58) Field of Classification Search
CPC ...... B65D 90/34; B65D 88/34; G05D 7/0146; G05D 7/0153; F16K 33/00; F16K 24/042; F16K 24/044; Y10T 137/7365; Y10T 137/7777; Y10T 137/7778; Y10T 137/7779; Y10T 137/8803; Y10T 137/3099; Y10T 137/7772; Y10T 137/778; Y10T 137/86292;
(Continued)

(56) References Cited

U.S. PATENT DOCUMENTS

| | | | | |
|---|---|---|---|---|
| 1,161,745 A | * | 11/1915 | Springman | ............. F16K 31/26 137/433 |
| 1,368,884 A | * | 2/1921 | Bozeman | ................ F16K 31/26 137/446 |
| 3,463,943 A | * | 8/1969 | Parkinson | ............. H02N 2/183 431/255 |

(Continued)

FOREIGN PATENT DOCUMENTS

TW   M529681 U   10/2016

OTHER PUBLICATIONS

Search Report appended to an Office Action, which was issued to Taiwanese counterpart application No. 109100604 by the TIPO dated Jul. 9, 2020, with an English translation thereof.

*Primary Examiner* — Craig J Price

(57) ABSTRACT

A vent valve includes an outer frame, a ventilation box movable in the outer frame, a sealing cover, a buoyant box and elongate sliding members. The ventilation box has an interior space. The sealing cover has a cover opening, and closes/opens a surrounding space defined by the ventilation box and the outer frame. The buoyant box is disposed within the interior space. When the buoyant box abuts the sealing cover and closes the cover opening, the cover opening is disconnected from the interior space. When the buoyant box moves away from the sealing cover, the interior space communicates the cover opening. The sliding members slidingly contact the outer frame and ventilation box to guide sliding movements.

5 Claims, 8 Drawing Sheets

(51) Int. Cl.
*B65D 90/34* (2006.01)
*F16K 33/00* (2006.01)

(52) U.S. Cl.
CPC .......... *F16K 33/00* (2013.01); *Y10T 137/7365* (2015.04); *Y10T 137/7772* (2015.04); *Y10T 137/88022* (2015.04)

(58) Field of Classification Search
CPC .................. Y10T 137/88022–88038; Y10T 137/88062; F17C 2250/0413; F17C 2250/0332; F17C 2250/0335
USPC ....... 137/630, 185, 168, 430, 410, 411, 172, 137/397, 198, 194, 165, 200, 578, 588, 137/587, 493.1, 493.7, 493.8, 493.9, 504, 137/423, 429, 442, 444, 614.16–614.18, 137/614.21; 222/68; 220/216–227
See application file for complete search history.

(56) References Cited

U.S. PATENT DOCUMENTS

| | | | | |
|---|---|---|---|---|
| 3,883,032 A * | 5/1975 | Fisher | ................ | B65D 88/34 200/220 |
| 4,520,839 A * | 6/1985 | Roff | ................ | F16K 24/042 137/202 |
| 5,357,909 A * | 10/1994 | Attinger | ................ | F01P 11/029 165/104.32 |
| 6,886,588 B2 * | 5/2005 | Malenfant | ................ | F16K 31/22 137/433 |
| 7,073,530 B2 * | 7/2006 | Pyle | ................ | B65D 90/44 220/221 |
| 7,721,903 B2 * | 5/2010 | Ben Afeef | ................ | B65D 88/38 220/227 |
| 8,689,821 B2 * | 4/2014 | Miller | ................ | F16K 47/023 137/430 |
| 10,081,488 B2 * | 9/2018 | Weng | ................ | B65D 88/42 |
| 11,428,343 B2 * | 8/2022 | Pannullo | ................ | F16K 31/465 |
| 2003/0151743 A1 * | 8/2003 | Fernando | ................ | G01N 21/253 356/319 |
| 2007/0240767 A1 * | 10/2007 | Rustad | ................ | F16K 31/20 137/430 |
| 2012/0152950 A1 * | 6/2012 | Al-Subaiey | ................ | B65D 88/38 137/172 |
| 2013/0075394 A1 * | 3/2013 | Suzuki | ................ | B60K 15/04 220/86.2 |
| 2021/0188539 A1 * | 6/2021 | Bingham | ................ | A62C 4/04 |

* cited by examiner

VENT VALVE FOR AN INNER FLOATING ROOF

CROSS-REFERENCE TO RELATED APPLICATION

This application claims priority to Taiwanese Patent Application No. 109100604, filed on Jan. 8, 2020.

FIELD

The disclosure relates to a vent valve of an inner floating roof.

BACKGROUND

An inner floating roof is used within a liquid storage tank storing a liquid including volatile organic compounds (VOCs) in order to movably cover the surface of the liquid for reducing evaporation of the liquid. To avoid evaporation of the liquid, the liquid storage tank needs to be covered airtightly by the inner floating roof. However, when the liquid is injected into or sucked out from the liquid storage tank, air must be ventilated inside the liquid storage tank so that the liquid can easily enter or exit the liquid storage tank and internal pressure can be regulated at the same time.

FIGS. 1 and 2 illustrate a vent valve 1 mounted to an inner floating roof 2. The vent valve 1 includes an outer frame 11, a support post 12, and a cover 13. The outer frame 11 has an outer surrounding wall 112 fixed to the floating roof 2, an inner surrounding wall 113 surrounded by the outer surrounding wall 112, a top wall 115 connecting the outer and inner surrounding walls 112, 113 and having multiple ventilating holes 114, and a through channel 111 surrounded by the inner surrounding wall 113 and extending through the top wall 115. The outer and inner surrounding walls 112, 113 cooperatively define an interior space 116 that opens toward the liquid surface and that communicates with the ventilating holes 114. The support post 12 extends through the through channel 111 to move upward and downward. The cover 13 is fixed atop the support post 12 and is disposed above the top wall 115.

The outer frame 11 and the inner floating roof 2 together float on and move upwardly and downwardly along with the liquid surface. On account of the weight of the support post 12, the cover 13 is moved downwardly and abuts the top wall 115 so that the ventilating holes 114 are closed by the cover 13 to prevent escape of volatilized gas and to achieve sealing effects of the inner floating roof 2. When the liquid is drawn out for maintenance, the liquid surface moves downwardly toward the tank bottom surface 3 of the liquid storage tank until the bottom end of the support post 12 hits the tank bottom surface 3, thereby preventing further downward movement of the support post 12 and the cover 13. As the outer frame 11 and the floating roof 2 move downwardly, the outer frames 11 (see FIG. 2) slides downwardly relative to the support post 12 and the cover 13 so that the cover 13 departs from the top wall 115 and opens the ventilating holes 114. Thus, air can enter the interior space 116 through the ventilating holes 114, and flows to a level below the floating roof 2. Therefore, excessive accumulation of volatilized gases can be avoided beneath the inner floating roof 2.

However, the vent valve 1 is open only in the situation that the support post 12 abuts the tank bottom surface 3. In other situations, the vent valve 1 does not open. Therefore, neither air ventilation nor pressure regulation is possible. In addition, during upward and downward movement of the support post 12 relative to the inner surrounding wall 113, the outer surface of the support post 12 entirely and frictionally contacts the inner surrounding wall 13. This causes the metallic support post 12 and the inner surrounding wall 113 to wear easily. Lack of ventilating air may lead to a problem in that the cover 13 cannot open easily due to vacuum pressure. Further, because the tank bottom surface 3 is uneven, the support post 12 is prone to tilt when hitting the tank bottom surface 3, thereby rendering the vent valve 1 unable to operate smoothly and even damaging the vent valve 1.

SUMMARY

Therefore, an object of the disclosure is to provide a vent valve that not only provides good pressure regulating effects, but also enables smooth sliding movements of component parts.

According to the disclosure, a vent valve includes an outer frame, a ventilation box, a sealing cover, a buoyant box, and a plurality of elongate sliding members.

The outer frame is configured to be fixed to an interior floating roof.

The ventilation box is movably disposed within and cooperates with the outer frame to define a surrounding space therebetween. The ventilation box has a box wall, a plurality of vent holes extending through the box wall in fluid communication with the surrounding space, and an interior space fluidly communicating with the vent holes.

The sealing cover is fixed atop the ventilation box and is disposed above the outer frame. The sealing cover has a cover opening. The sealing cover closes the surrounding space when abutting the outer frame. The sealing cover opens the surrounding space when moving upward away from the outer frame.

The buoyant box is movably disposed within the interior space and is situated below the sealing cover. When the buoyant box abuts the sealing cover, the buoyant box closes the cover opening so that the cover opening is fluidly disconnected from the interior space. When the buoyant box moves downward away from the sealing cover, the interior space fluidly communicates the cover opening.

The elongate sliding members are disposed within the surrounding space and the interior space. The elongate sliding members disposed within the surrounding space slidably contact one of the outer frame and the ventilation box. The elongate sliding members disposed within the interior space slidably contact one of the ventilation box and the buoyant box.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
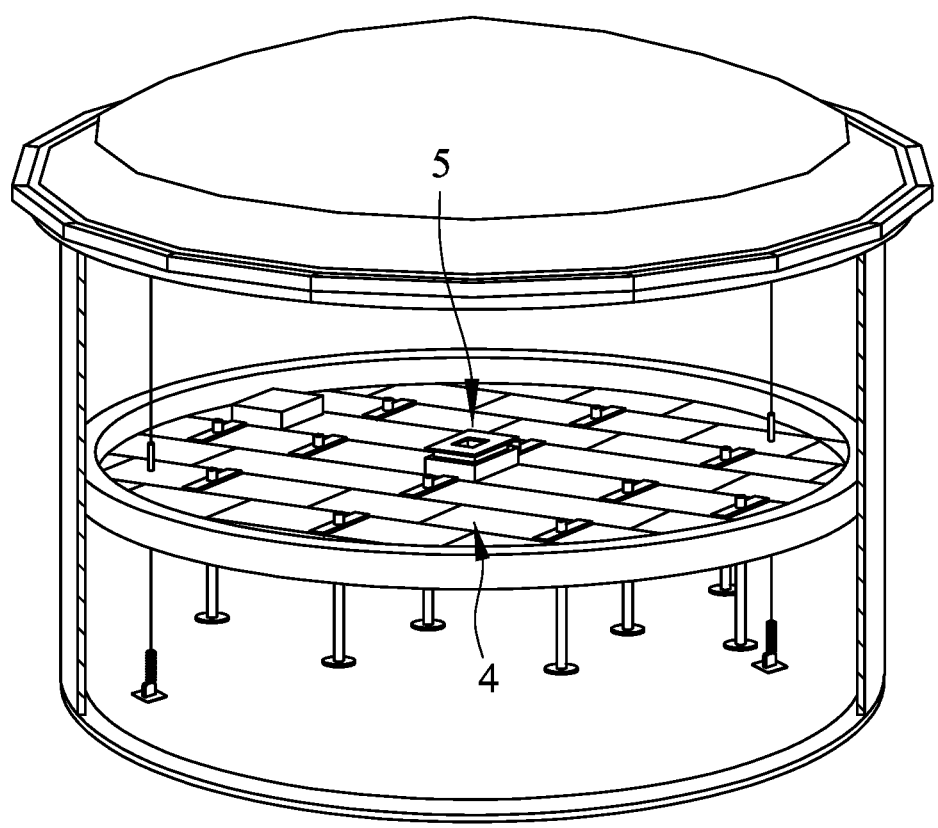
FIG. 3 illustrates a fluid tank incorporating an inner floating roof with a vent valve according to an embodiment of the disclosure.
Figure 4:
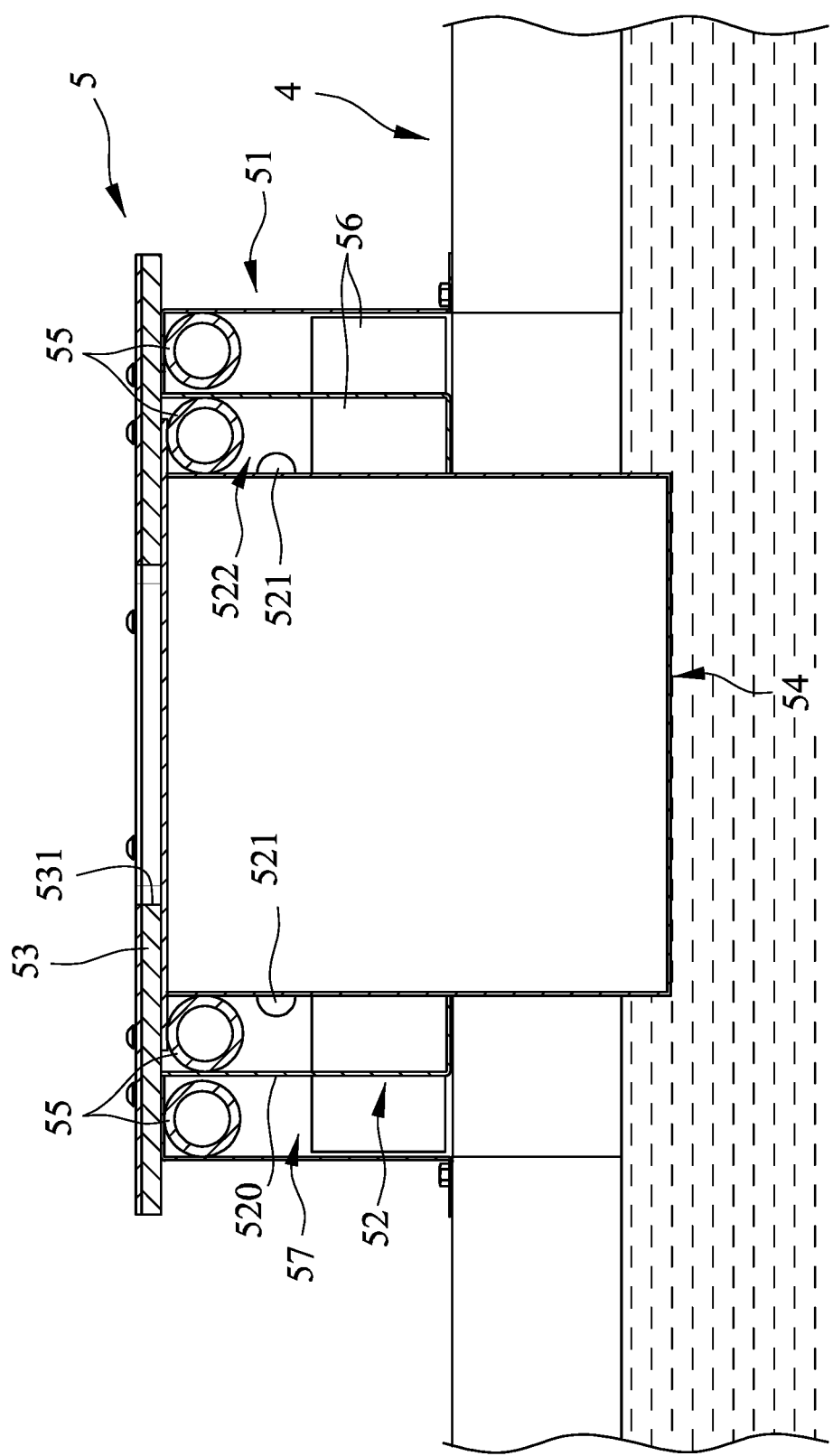
FIG. 4 is a fragmentary sectional view illustrating the inner floating roof with the vent valve of the embodiment in a closed state.
Figure 5:
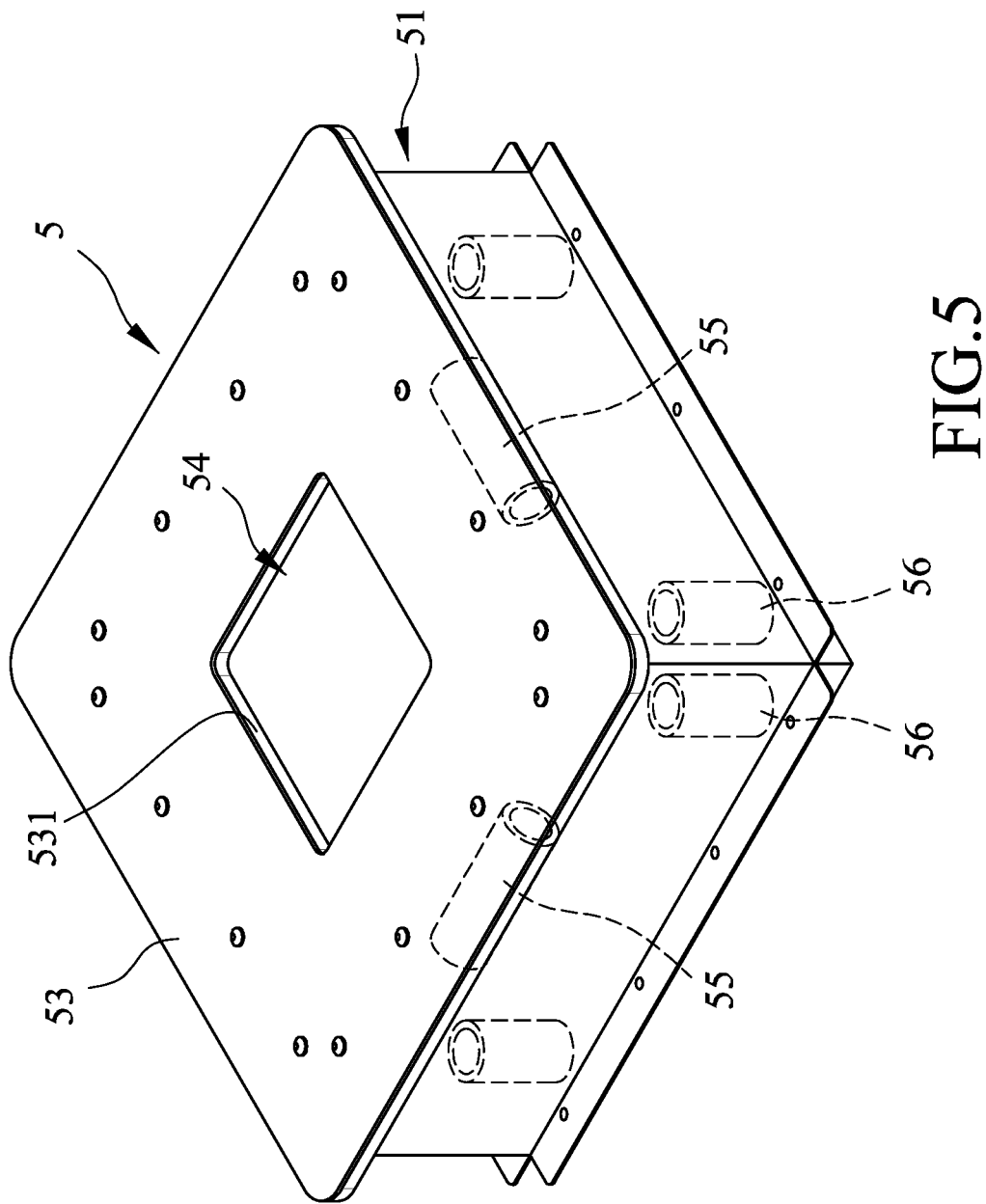
FIG. 5 is a perspective view illustrating the vent valve of the embodiment in the closed state.

FIGS. 3 to 5 illustrate a vent valve 5 according to an embodiment of the disclosure for mounting to an inner floating roof 4 in a liquid storage tank. The vent valve 5 includes an outer frame 51, a ventilation box 52, a sealing cover 53, a buoyant box 54, a plurality of elongate sliding members 55, and a plurality of guiding members 56.

The outer frame 51 is fixed to the inner floating roof 4.

The ventilation box 52 is movably disposed within and cooperates with the outer frame 51 to define a surrounding space 57 therebetween. The ventilation box 52 has a box wall 520, a plurality of vent holes 521 extending through the box wall 520 in fluid communication with the surrounding space 57, and an interior space 522 fluidly communicating with the vent holes 521.

The sealing cover 53 is fixed atop the ventilation box 52 and is disposed above the outer frame 51. The sealing cover 53 has a cover opening 531. The sealing cover 53 closes the surrounding space 57 when abutting the outer frame 51. The sealing cover 53 opens the surrounding space 57 when moving upward away from the outer frame 51.

The buoyant box 54 is movably disposed within the interior space 522 and is situated below the sealing cover 53. When the buoyant box 54 abuts the sealing cover 53, the buoyant box 54 closes the cover opening 531 so that the cover opening 531 is fluidly disconnected from the interior space 522. When the buoyant box 54 moves downward away from the sealing cover 53, the interior space 522 fluidly communicates the cover opening 531.

The elongate sliding members 55 are disposed within the surrounding space 57 and the interior space 522. In this embodiment, the elongate sliding members 55 are tubular and extend in horizontal directions. The elongate sliding member 55 disposed within the surrounding space 57 are fixed to the outer frame 51 and slidably contact the ventilation box 52. The elongate sliding members 55 disposed within the interior space 522 are fixed to the buoyant box 54 and slidably contact the ventilation box 52. Each elongate sliding member 55 is made of a non-metal material with acid and alkali resistance, as well as resistance to volatile organic liquids, and has a low coefficient of friction to provide good sliding effect.

The guiding members 56 are disposed within the surrounding space 57 and the interior space 522. In this embodiment, the guiding members 56 are tubular and extend in a vertical direction. The guiding members 56 disposed within the surrounding space 57 are fixed to the ventilation box 52 and slidably contact the outer frame 51. The guiding members 56 disposed within the interior space 522 are fixed to the ventilation box 52 and slidably contact the buoyant box 54. Each guiding member 56 is made of a non-metal material with acid and alkali resistance, as well as resistance to volatile organic liquids, and has a low coefficient of friction to provide good sliding effect.

As shown in FIGS. 4 and 5, when the level of the liquid surface is stable, the sealing cover 53 presses downward the outer frame 51 and closes the surrounding space 57. The buoyant box 54 is moved upward by a buoyant force to abut the sealing cover 53 and to close the cover opening 531. In this situation, the vent valve 5 is in a closed state that prevents the liquid vaporized from escaping. While the buoyant box 54 can float to a level as high as that of the inner floating roof 4, because the sealing cover 53 is provided with a weight that counteracts the buoyant force of the buoyant box 54, the sealing cover 53 and the buoyant box 54 are placed in a balanced state as shown in FIG. 4.

Figure 6:
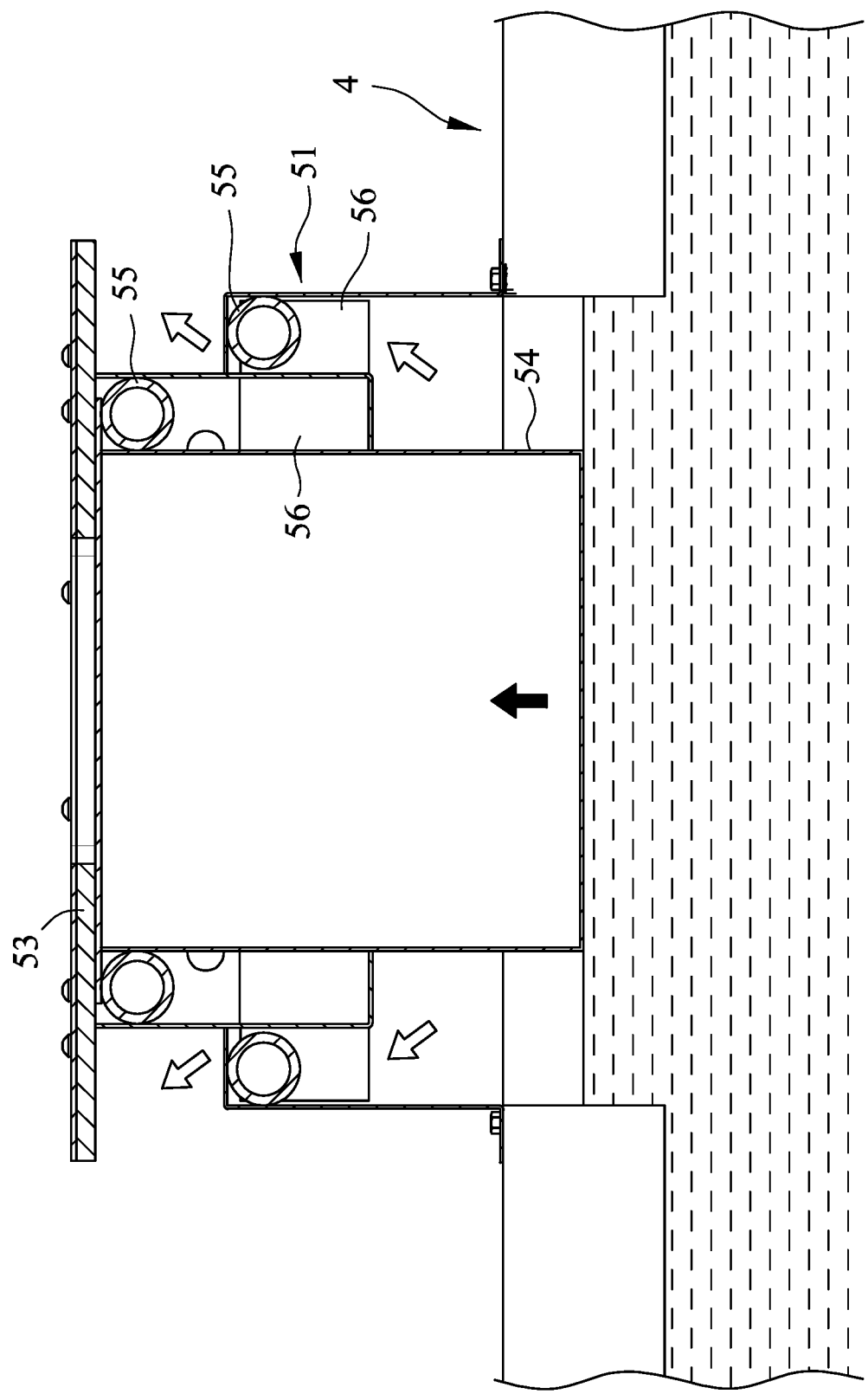
FIG. 6 is a fragmentary sectional view illustrating the vent valve that is opened when liquid is injected.
Figure 7:
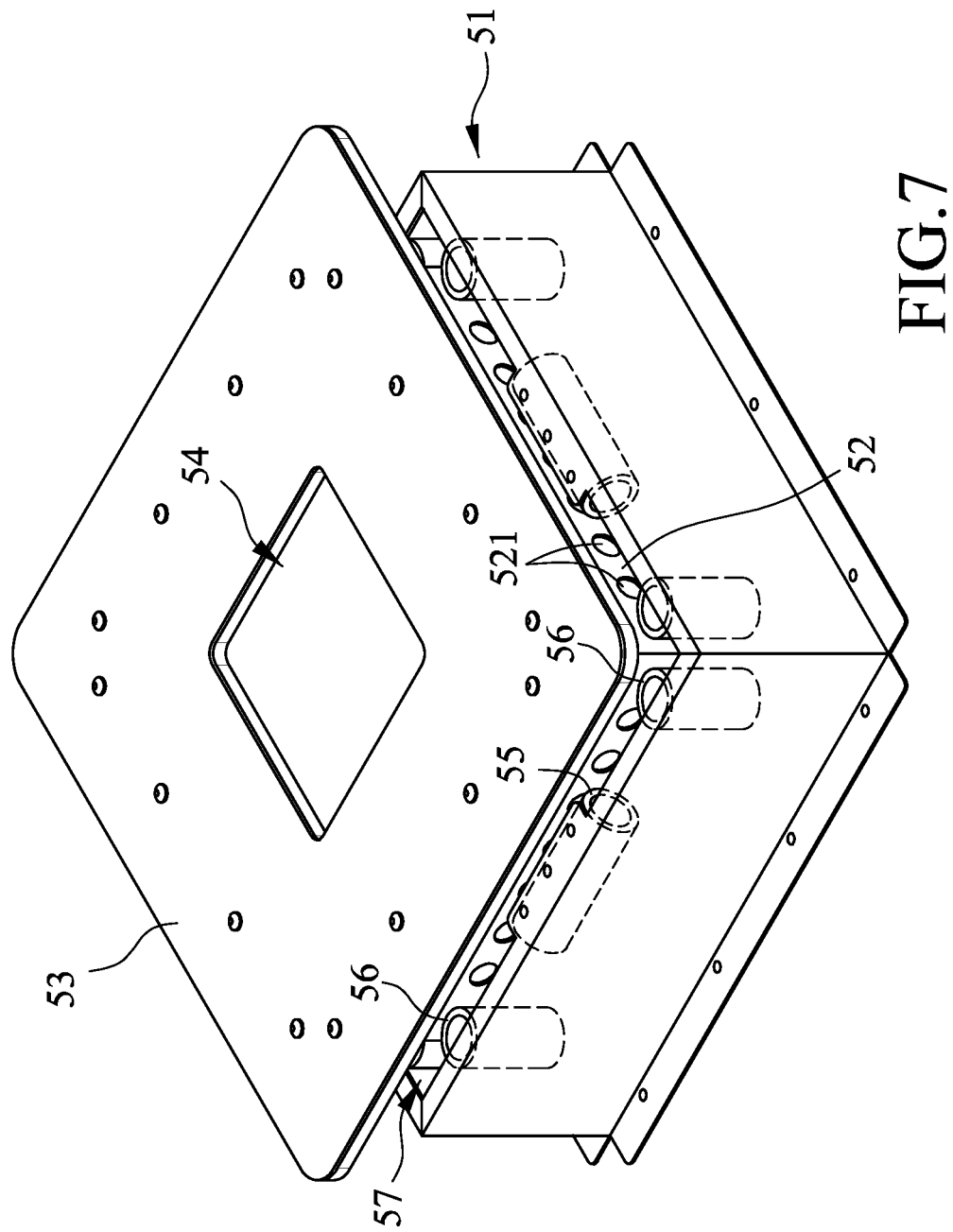
FIG. 7 is a perspective view illustrating the buoyant box in the opened state shown in FIG. 6.

Referring to FIGS. 6 and 7, when an external liquid is injected, the rising liquid surface and the increased pressure at the beginning of injection cause the buoyant box 54 to move upward and push the sealing cover 53 away from the outer frame 51. As the sealing cover 53 opens the surrounding space 57, an internal pressure is released through the surrounding space 57 to reduce vibration of and to increase stability of the inner floating roof 4. As air can be ventilated, a smooth operation of injecting the liquid can be realized.

Figure 8:
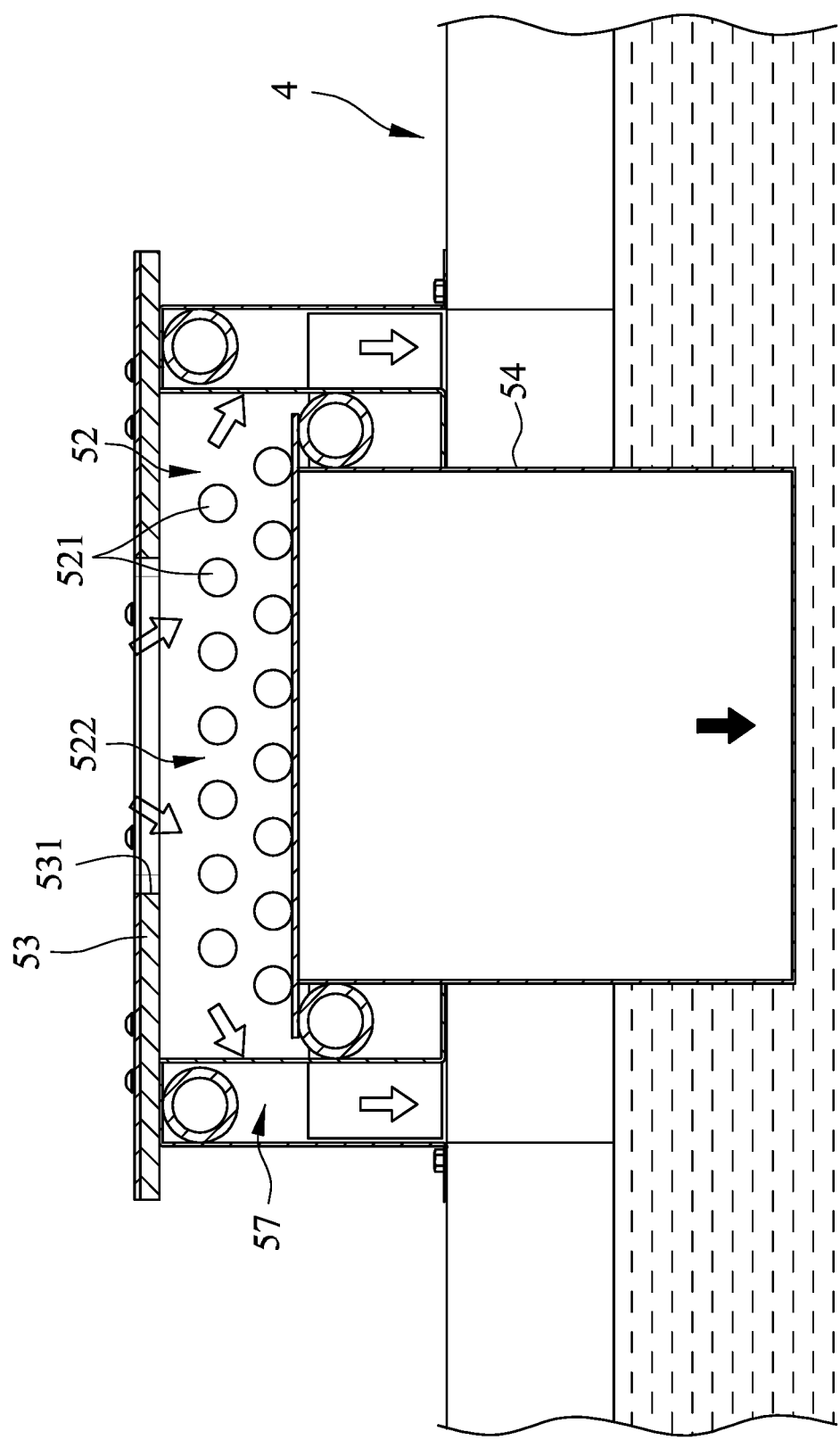
FIG. 8 is a fragmentary sectional view illustrating the vent valve that is opened when the liquid is drawn out.
Figure 9:
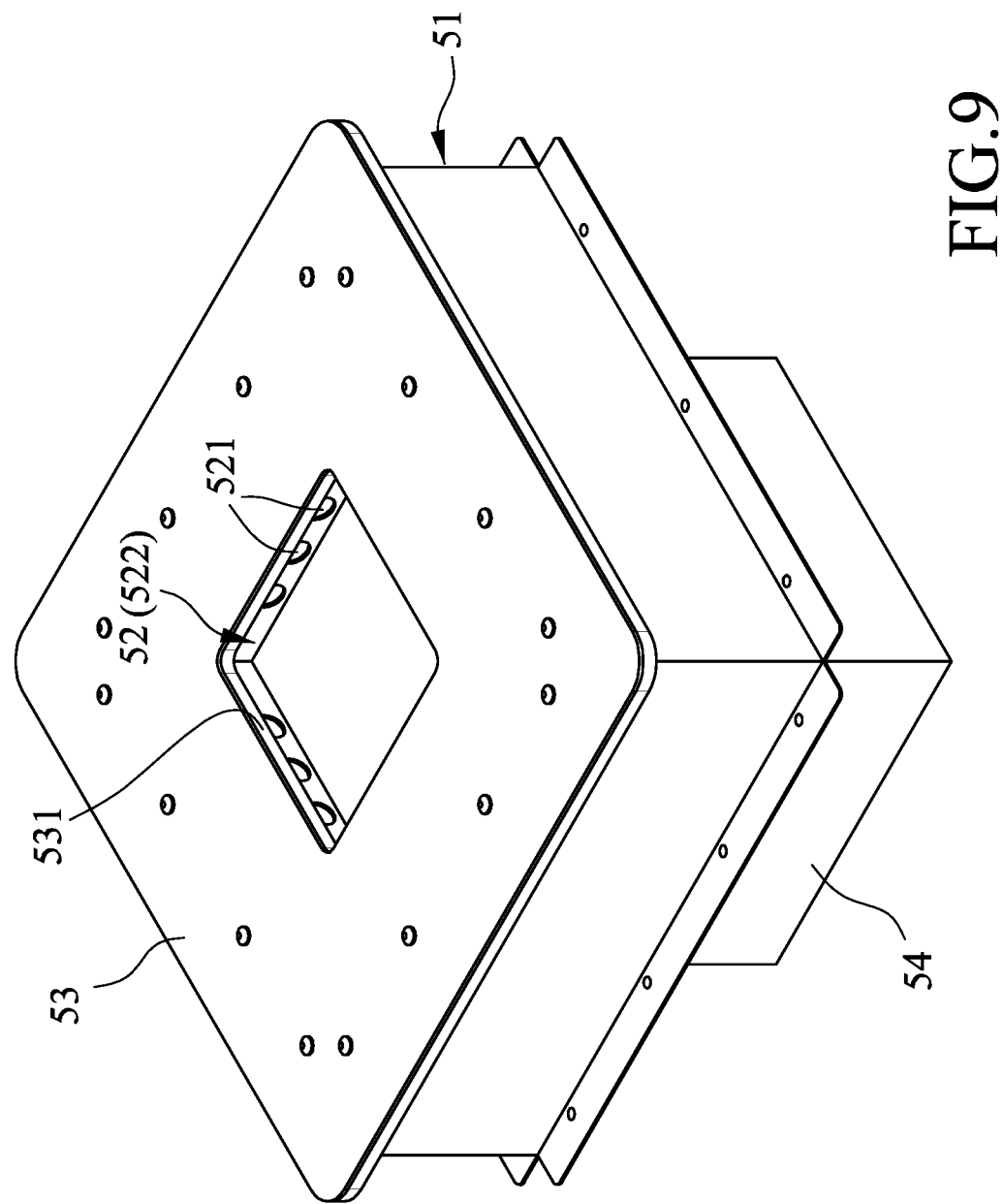
FIG. 9 is a perspective view illustrating the buoyant box at a state where no buoyant force exists.

Referring to FIGS. 8 and 9, when the liquid is drawn out, the descending liquid surface and the reduced pressure at the beginning of drawing the liquid can produce a suction force so that the buoyant box 54 moves downward away from the sealing cover 53 to open the cover opening 531. Therefore, air ventilation can reach below the inner floating roof 4 through the cover opening 531, the interior space 522, the vent holes 521, and the surrounding space 57, thereby enabling a smooth liquid drawing operation.

Figure 1:
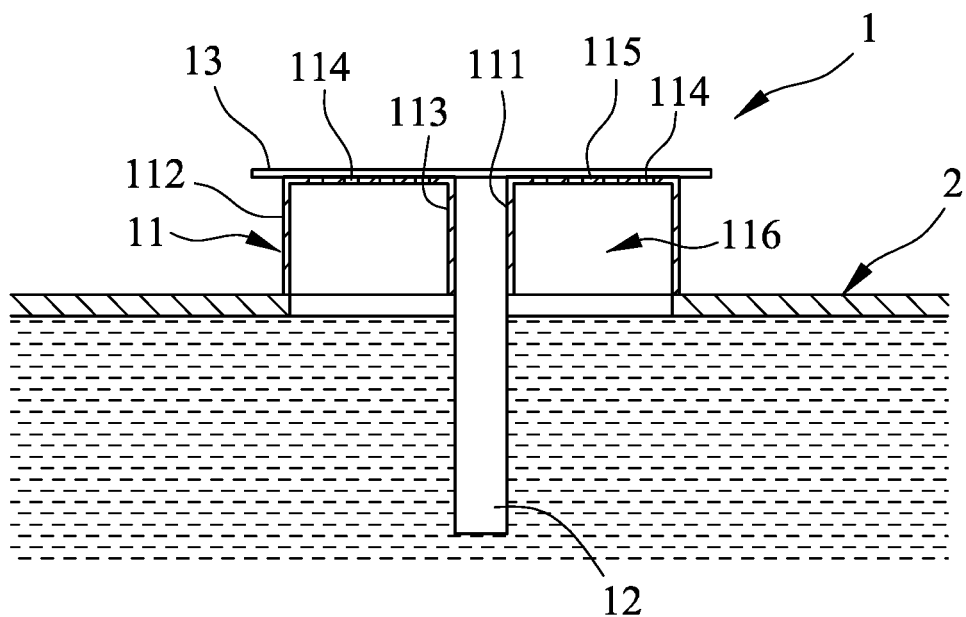
FIG. 1 is a fragmentary sectional view illustrating an existing vent valve of an inner floating roof in a close state.
Figure 2:
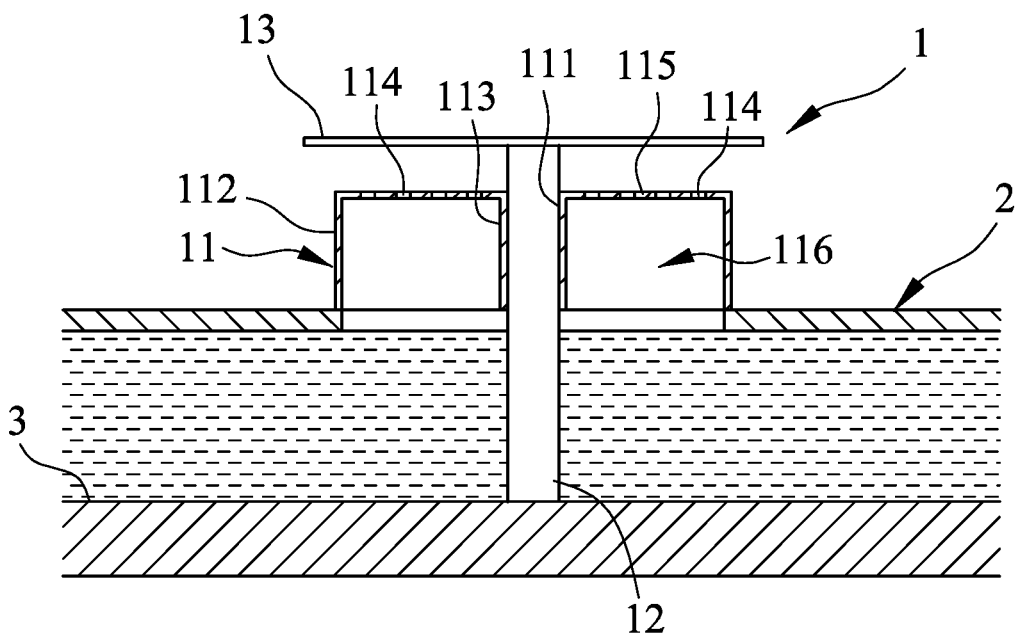
FIG. 2 is a view similar to FIG. 1, but illustrating the existing vent vale in an open state.

FIGS. 6 and 8 show two different ventilation paths (see arrows in the Figures). This two-ways ventilating fashion provides better ventilating effects than the one-way ventilation valve of the prior art (see Figures 1 and 2). In addition, because the vent valve according to the disclosure can be opened to regulate fluid pressure through the buoyant force of the buoyant box 54, it can avoid the problems encountered by the prior art that can be opened only by using the support post 12 (see FIGS. 1 and 2) to hit the tank bottom surface. Notably, when the buoyant box 54 is at a lowest position, or at a level set for carrying out a maintenance operation, the buoyant box 54 is not supported by the buoyant force and is hung downward as shown in FIG. 9.

Referring back to FIGS. 4 and 5, by virtue of the elongate sliding members 55 and the guiding members 56 having curved outer surfaces in sliding contact with the outer frame 51, the ventilation box 52 and the buoyant box 54, not only are frictional contact areas reduced, but relative sliding movements are also smooth. Further, because of non-metal materials used to make the elongate sliding members 55 and the guiding members 56, the risk of high temperature heat and sparks due to friction between metallic parts can be avoided. In addition, since the elongate sliding members 55 and the guiding members 56 are fixed in a non-rolling or non-rotating manner, design considerations for smoothness of rolling or rotating actions is unnecessary. Therefore, installation and replacement of the vent valve 5 is easy and convenient. By virtue of the elongate sliding members 55 and the guiding members 56, the three-components structure of the outer frame 51, the ventilation box 52 and the buoyant box 54 can be constructed easily without using complicated assembling parts.

In this embodiment, two guiding members 56 are disposed respectively on two opposite sides of each elongate sliding member 55. However, in practice, the arrangement of the elongate sliding member 55 and guiding member 56 can be varied. The locations where the elongate sliding members 55 and the guiding members 56 are fixed can be changed. For example, the elongate sliding member 55 disposed within the surrounding space 57 may be fixed to the ventilation box 52. Further, the vent valve 5 may have only the elongate sliding members 55, or the guiding members 56, and the number and locations thereof may be varied based on conditions of balancing the same. In addition, depending on different types of liquids and different ventilation requirements, the buoyant box 54 may be provided with varying suitable weights to adjust buoyant forces and flow paths (e.g., to adjust the opening degrees of the cover opening 531). Proper pressure releasing and ventilation functions may therefore achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vent valve, comprising:
    an outer frame configured to be fixed to an interior floating roof;
    a ventilation box movably disposed within and cooperating with said outer frame to define a surrounding space therebetween, said ventilation box having a box wall, a plurality of vent holes extending through said box wall in fluid communication with said surrounding space, and an interior space fluidly communicating with said vent holes;
    a sealing cover fixed atop said ventilation box and disposed above said outer frame, said sealing cover having a cover opening, said sealing cover closing said surrounding space when abutting said outer frame, said sealing cover opening said surrounding space when moving upward away from said outer frame;
    a buoyant box movably disposed within said interior space and situated below said sealing cover, wherein when said buoyant box abuts said sealing cover, said buoyant box closes said cover opening so that said cover opening is fluidly disconnected from said interior space, and when said buoyant box moves downward away from said sealing cover, said interior space fluidly communicates said cover opening; and
    a plurality of elongate sliding members disposed within said surrounding space and said interior space, said elongate sliding members disposed within said surrounding space slidably contacting one of said outer frame and said ventilation box, said elongate sliding members disposed within said interior space slidably contacting one of said ventilation box and said buoyant box, each of said elongate sliding members being made of a non-metal material;
    wherein said elongate sliding members disposed within said surrounding space are fixed to said outer frame and slidably contact said ventilation box; and
    wherein said elongate sliding members disposed within said interior space are fixed to said buoyant box and slidably contact said ventilation box.

2. The vent valve as claimed in claim 1, wherein said elongate sliding members are tubular and extend in horizontal directions.

3. The vent valve as claimed in claim 2, further comprising a plurality of guiding members disposed within said surrounding space and said interior space, said guiding members extending in a vertical direction, said guiding members disposed within said surrounding space slidably contacting one of said outer frame and said ventilation box, said guiding members disposed within said interior space slidably contacting one of said ventilation box and said buoyant box.

4. The vent valve as claimed in claim 3, wherein said guiding members disposed within said surrounding space are fixed to said ventilation box and slidably contact said outer frame.

5. The vent valve as claimed in claim 4, wherein said guiding members disposed within said interior space are fixed to said ventilation box and slidably contact said buoyant box.

* * * * *